Aug. 26, 1930.  J. MAHER  1,774,025

ELECTRIC SIGNALING SYSTEM AND APPARATUS

Filed March 31, 1924  8 Sheets-Sheet 1

Inventor:
J. MAHER

Aug. 26, 1930.  J. MAHER  1,774,025
ELECTRIC SIGNALING SYSTEM AND APPARATUS
Filed March 31, 1924  8 Sheets-Sheet 2

Aug. 26, 1930.    J. MAHER    1,774,025
ELECTRIC SIGNALING SYSTEM AND APPARATUS
Filed March 31, 1924    8 Sheets-Sheet 4

Inventor:
J. MAHER

Aug. 26, 1930.  J. MAHER  1,774,025
ELECTRIC SIGNALING SYSTEM AND APPARATUS
Filed March 31, 1924   8 Sheets-Sheet 5

Inventor.
J. MAHER

Fisher Moser &c.
Attys

Patented Aug. 26, 1930

1,774,025

UNITED STATES PATENT OFFICE

JOHN MAHER, OF CLEVELAND, OHIO

ELECTRIC SIGNALING SYSTEM AND APPARATUS

Application filed March 31, 1924. Serial No. 703,059.

My invention relates to electric signaling, and is an improvement involving a system and apparatus for signaling a change in level or altitude of an object or body, for example, the draft or list of a ship, or the depth or height of a body of liquid. As exemplified herein, the improvement is especially adapted to signal automatically at a plurality of stations on board of a ship the correct draft at the stern and bow of the ship and also the draft and list amidship at port and starboard, thereby facilitating and safeguarding loading and navigating the vessel, particularly in shallow waters. The invention is also adapted to produce a signal automatically when the vessel is under headway and moving from deep or safe water into shallower or unsafe water, utilizing the known observable fact and event of the settling of the ship at the stern under such conditions, especially in vessels driven by propellers. The apparatus is also designed to provide reliable signals when only slight changes in levels and depths take place, that is to say, provision is made to assure independent signaling in inches as well as in feet and to indicate at the respective stations when any independent circuit is out of commission or not working and the corresponding single reading is incorrect.

In the acompanying drawings.

The invention as applied to ships, consists of a pipe or tubular column 2 six to eight inches in diameter placed upright within the ship S and extending a substantial distance below the lowest water line of the ship. A smaller pipe connection 3 at the bottom of tube 2 extends through the side or bottom of the ship to keep column 2 in constant open communication with the body of water outside, excepting when a cock 4 is closed to permit column 2 to be examined, emptied or cleaned. A small body of water is thus constantly maintained within the column at the same level as the larger body of water outside, which will vary as the displacement of the ship varies, when loaded or unloaded, or as it may list or settle at the stern or rise at the bow under given operating conditions. However, no material change in the height of the water in the column is produced by rolling or pitching of the ship or a rough sea outside, because the small diameter of the column and the still smaller pipe connection 3 constantly restrain or restrict the movement of the small trapped body of water. Consequently, a float 5 housed within column 2 will approximately indicate the actual draft of the ship in either quiet or rough water, and sensitive synchronizing mechanisms may be employed with the float to indicate at remote distances the movement and position of the float and therethrough the draft of the ship within the working limits of the float column. Assuming the draft of the ship to vary from twelve to twenty-four feet, the standpipe or column 2 would be constructed accordingly to permit the float to rise and fall a corresponding distance therein. In my present apparatus the stand pipe or column 2 extends through a packing gland 6 and a deck or floor 7 of the ship and is surmounted by a cap or casing 8 in which a compound electric switch A, comprising separate sets of contacts and two differentially-rotatable switch arms, is adapted to be operated by float 5. Thus a cable 10 connects float 5 to a large winding drum 11 mounted upon a cross shaft 12 journaled within brackets spanning the interior of casing 8, and unwinding of the cable from the drum rotates said shaft and a switch arm 13 thereon one complete revolution in every foot or twelve inches of downward travel of the float, thereby causing the arm to engage twelve separate contact segments 14 arranged radially in a circle at one end of shaft 12. A counter revolution of shaft 12 is effected by a weight 15 suspended by a cable 16 from a reduced winding extension 17 of drum 11, and weight 15 is confined within a separate guiding tube 18 located within column 2. A second rotatable switch arm 19 is secured to a sleeve 20 which is free to rotate on shaft 12, and rotation at a greatly reduced speed is transmitted to this sleeve and switch arm 19 by a pinion 21 pinned to shaft 12 and meshing with a larger gear 22 having a pinion 23 which in turn meshes with a large gear 24 on sleeve 20. In an installation where the travel of float 5 is limited to twelve feet the slower moving switch arm 19 is adapted to engage twelve separated contact segments 25 successively, each segment representing one foot of travel of the float. The two switch arms 13 and 19, respectively, are not insulated from shaft 12 and each other; therefore, the twelve contacts 14 representing the changes in draft in inches may be placed successively in an electric circuit in series with each single contact 25 representing the draft of the ship in feet. In other words, as electrically connected, each complete revolution of switch arm 13 makes twelve independent electrical contacts in approximately one-twelfth of a revolution of switch arm 19, thereby permitting twelve separate electrical circuits to be established successively through each one of the twelve contacts 25 in turn, and thereby making it possible to compound signaling operations through a minimum of wires, only twelve lead-in wires and the same number of outgoing wires being used in this selective switch to effect one hundred and forty-four separate electric circuits successively.

Figure 1:
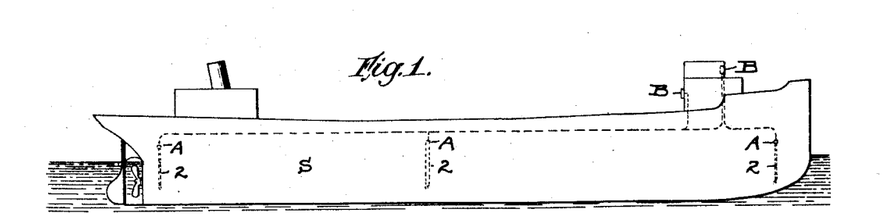
Fig. 1 is a side elevation of a ship showing a general diagram of my electrical signaling system installed therein.
Figure 2:
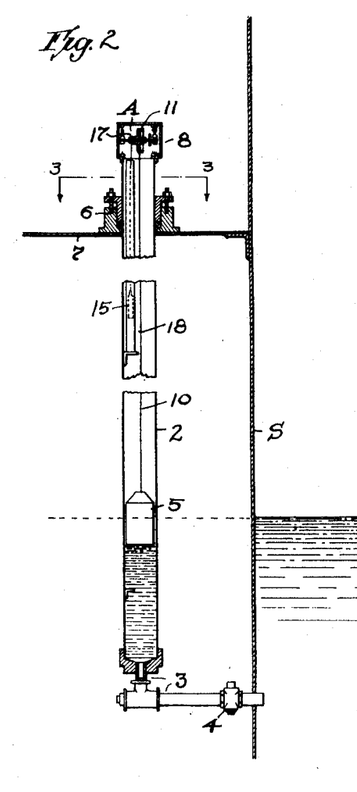
Fig. 2 is a vertical section through one of the float columns attached to one side of the hull of the ship.
Figure 3:
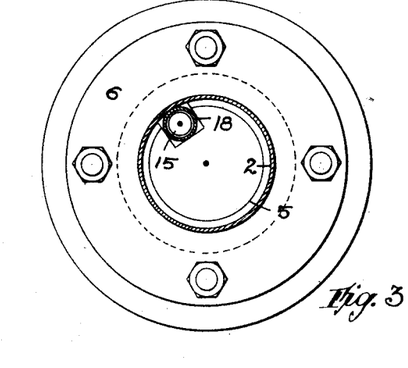
Fig. 3 is an enlarged cross sectional view of the float column on line 3—3 of Fig. 2.
Figure 4:
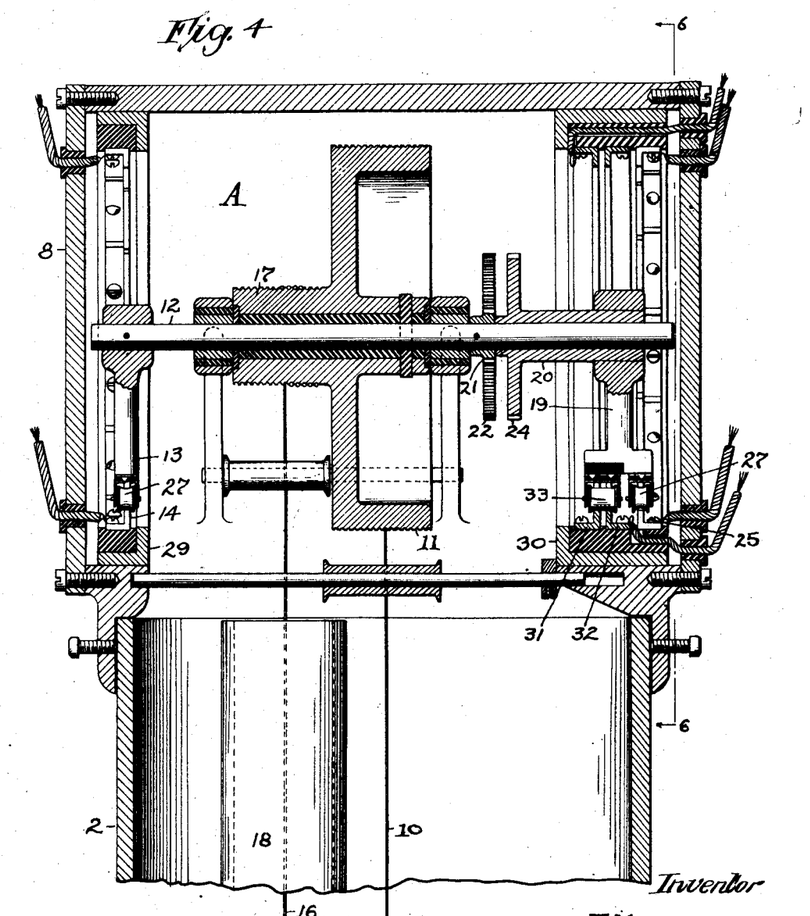
Fig. 4 is a vertical section on a still larger scale of the electric switch mechanism surmounting the float column, on line 4—4 of Fig. 6.
Figure 5:
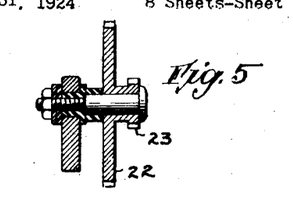
Fig. 5 is a sectional view of a part of the gear mechanism of the electric switch on line 5—5 of Fig. 6.
Figure 6:
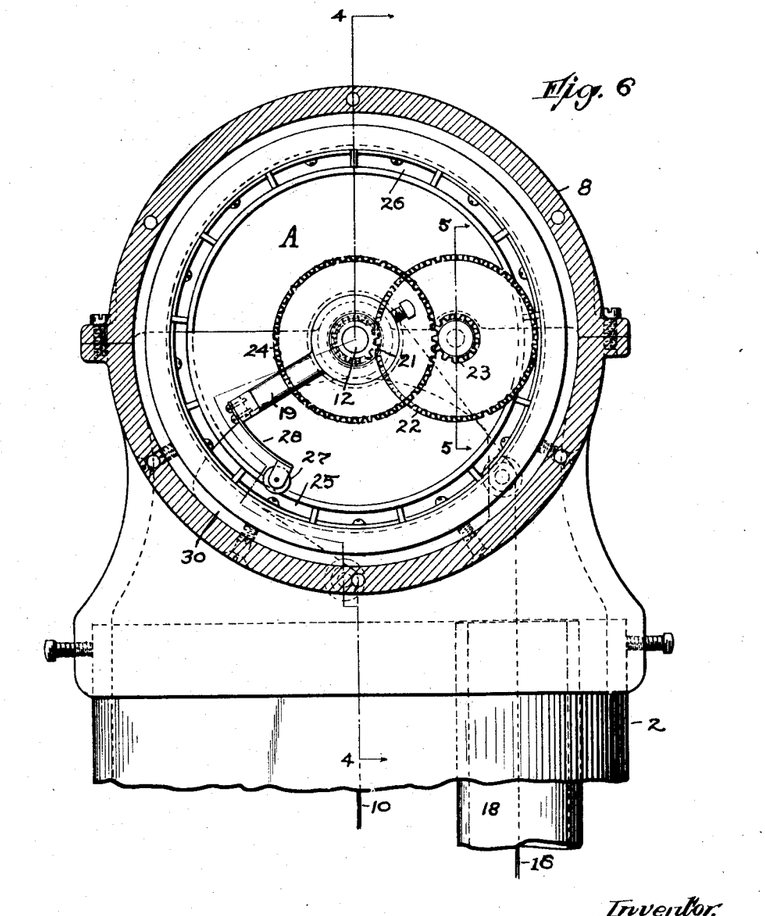
Fig. 6 is a vertical section and side elevation of the switch on line 6—6 of Fig. 4.
Figures 7, 9:
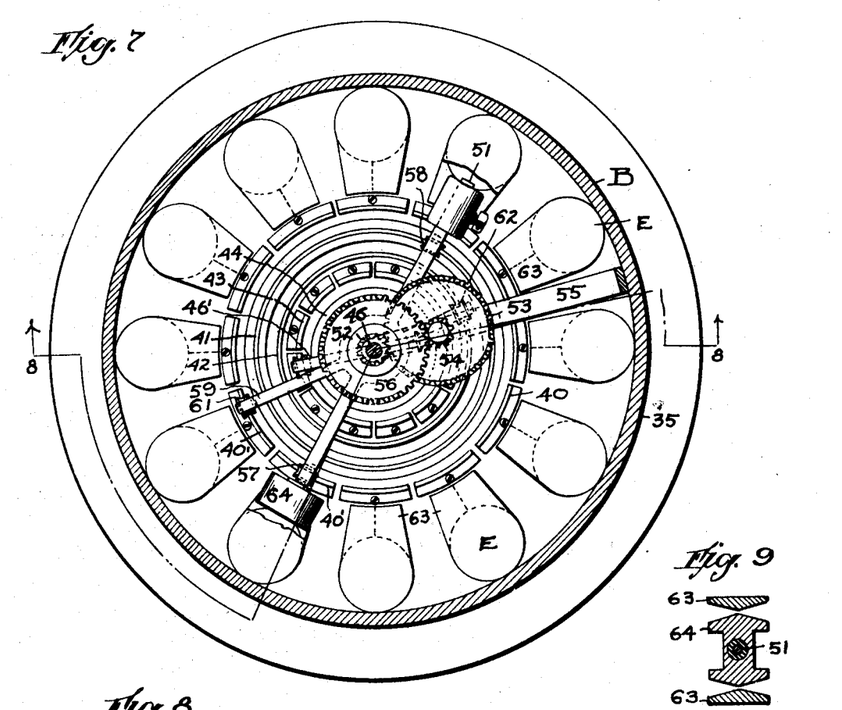
Fig. 7 is a sectional view and elevation of one of the electromagnetic indicators, on line 7—7 of Fig. 8.
Fig. 9 is a sectional view of the beveled poles of one of the electromagnets and the movable armature, on line 9—9 of Fig. 8.
Figure 8:
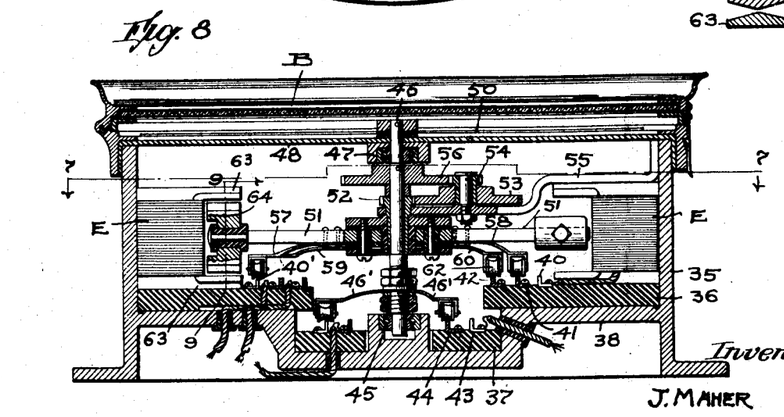
Fig. 8 is a section of the same indicator on line 8—8 of Fig. 7.
Figure 10:
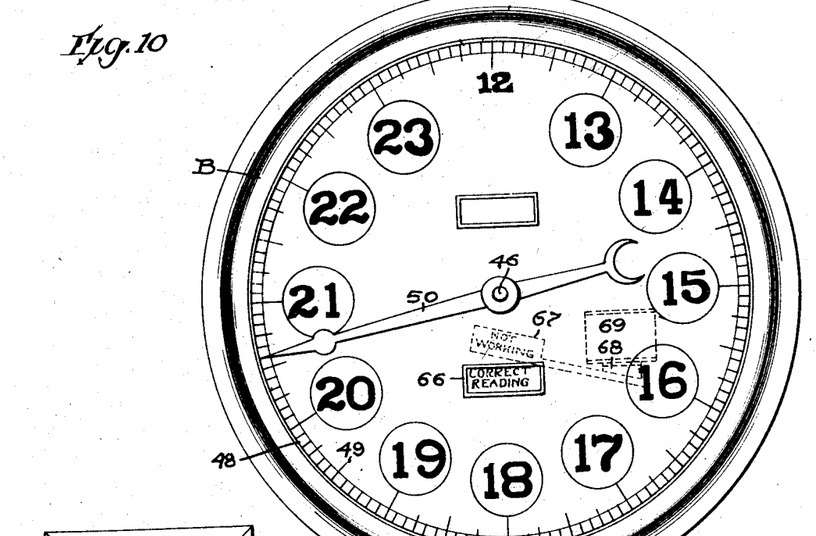
Fig. 10 is an elevation of one of the electromagnetic indicators, showing the dial side only.

An extra segment 26 see Fig. 6 may also be used in the circle with contacts 25 to provide a dead space or sector adapted to switch off the electric current when float 5 has reached the limits of its stroke in either direction in the water column. A yielding rolling contact is obtained by mounting rollers 27 at the ends of spring extensions 28 on the respective switch arms, 13 and 19, respectively, and the contact segments 14 and 25, respectively are mounted upon insulating material confined within separate flanged rings 29 and 30, respectively, seated removably within the opposite ends of the circular body of the cap or casing 8. Two additional annular tracks or conductors 31 and 32, respectively, are mounted in insulated seating position within ring 30 opposite the slowly rotating switch arm 19, and a wide contact roller 33 secured in an insulated position upon arm 19 adjacent roller 27 is adapted to ride on both of these tracks or conductors 31 and 32 to maintain a closed signaling circuit until a gap or insulated segment 34 in one of the annular conductors is reached, see Fig. 14. The flow of the current passing through the said conductors and rollers will then be interrupted at segment 34 and the main signaling circuit opened to prevent a continuance of movement of the electro-magnetic devices within the signaling dial or dials B used in connection with and controlled by the compound or double selective switch A.

A plural number of signaling dials B may be used with a single float column and its rotatable selective switch A, and in a complete signaling installation for a ship it has been found desirable to use independent float columns and switches fore and aft and also amidship at port and starboard, each switch A serving to operate and control one or more dials B located in the pilot house, on deck, and other convenient observing stations on the ship. The respective dials for the separate switches are also preferably grouped together in a cabinet at each station so that comparative readings of conditions fore and aft and amidship may be observed coincidentally.

Each automatic signaling dial B, see Figs. 7 to 10, comprises a hollow body 35 in which two annular insulating plates 36 and 37 are supported in concentric relation at different elevations upon a stepped bottom 38. Upper plate 36 carries three circular tracks 40, 41, and 42, respectively, in spaced concentric relation near its inner circumference, and now it may be noted that the outer track 40 is composed of twelve separate contact segments 40′ which are complementary to the twelve contacts 14 of switch A representing the draft of the ship in inches. The twelve contacts 25 of switch A representing the draft of the ship in feet also have complementary contact segments 43 in dial B, and these segments 43 are mounted in a smaller circle upon lower plate 37 adjacent an annular track or conductor 44 of still smaller diameter surrounding a central boss and ball bearing 45 for a rotatable spindle 46. The opposite end of this spindle extends through a ball bearing 47 affixed to a cover plate 48 bearing a circle of indicia or graduated marks 49 representing the draft of the ship in feet and inches, the twelve divisions in feet being indicated in the present instance by the numerals, 12 to 23, inclusive, and the twelve divisions in inches being indicated by the shorter graduation marks between such numerals. A pointer or index finger 50 is affixed to the outer end of spindle 46, and this shaft and finger rotate proportionately to the movement of float 5, that is, each movement in inches of float 5 effects a proportionate movement of the index finger to indicate the relative position of the float and the draft of the ship in inches. Consequently the rotative movement of spindle 46 is relatively slow, compared with the rotative movement of its driving member which comprises a counter-balanced arm 51 affixed in an insulated position upon the elongated hub of a pinion 52 sleeved to rotate independently upon spindle 46 but geared thereto by a train of gears consisting of a large gear 53 meshing with pinion 52, a small gear 54 connected with gear 53 and supported by a bracket 55, and a second larger gear 56 pinned to the spindle and meshing with small gear 54. A pair of spring switch members 57 and 58, respectively, are affixed to the bottom of switch arm 51 and carry contact rollers which ride upon track 41 and the circular track consisting of segments 40'. The rotatable driving arm of metal thus also serves as a switch member for placing the twelve contacts 40' successively in an electric circuit. In conjunction with the foregoing it should be noted that an additional pair of electrically connected spring switching elements 59 and 60 carrying contact rollers 61 and 62, respectively, also engage the ring of contacts 40' and the third inner conducting ring or track 42, and that these additional switching elements extend on different radial lines from the spindle to place the spring arm or element 59 in engagement with a different segment 40' than the one engaged by contact member 57 to permit two separate electric circuits to be established either contemporaneously or one in lieu of the other.

Switch arm 51 is adapted to be rotated around the spindle, step by step or intermittently, by a series of electro-magnets E arranged in a circle opposite the separate contact segments 40', each electro-magnet having parallelly-spaced laterally-extending pole pieces 63 between which an armature 64 carried by arm 51 is adapted to travel. The opposed faces of the pole pieces and the armature are beveled reversely, see Fig. 9, to bring the armature to a central position in respect to the pole pieces and the magnetic field. If desired, the pole pieces may be made wider, and the electro-magnets brought closer together in the circle than as shown. As arranged, the armature 64 will be attracted whenever an electro-magnet E is energized in a sector adjacent to the one in which the switch arm 51 happens to be stationed, thereby rotating the switch arm in that degree. This movement occurs whenever float 5 moves one inch and closes an electric circuit through selective switch A, and a continuing movement of the float inch by inch will rotate the switch arm step by step until the switch arm makes one complete revolution in one foot of travel of float 5. Thus, if the float moves twelve feet in column 2 the switch arm 51 will make twelve complete revolutions behind the face of the dial while the spindle 46, and its switch elements 46' which bridge tracks 43 and 44, make only one complete revolution with the index finger 50 traveling onward from numeral 12 to 23 plus, to indicate the exact position of the float and draft of the vessel.

To assure accuracy and reliability the float operated switch A and the dial B comprise complementary sets of contacts and switch members to establish separate active signaling circuits for each inch of travel of the float, and the rotation of the two switch arms in float-operated switch A is synchronously duplicated in signal dial B, the main switch arm 51 in the dial revolving once over twelve contacts 40' in every foot of travel of float 5 while the switch elements 46' on spindle 46 revolve with the spindle one-twelfth of a revolution over only one segmental contact in track 43 during each complete revolution of arm 51. The working arrangement of the parts is also such that inoperativeness of one of the electro-magnets will not place the apparatus entirely out of working order nor change the sequence of signals and correct readings, and if any one of the circuits for the electro-magnets becomes inoperative it is announced or displayed on the dial and the particular electro-magnet and circuit which is out of order is indicated by the position of the index finger. Thus, in Fig. 10, dial plate 48 is shown as having a rectangular opening 66 therein. Under normal conditions a display plate 67 bearing the words "Not working" is held in a raised and concealed position above sight opening 66 behind plate 48 by the armature 68 of an energized electro-magnet 69. Failure of one of the electro-magnets E to work when switch arm 51 rotates opposite thereto, if due to a break in one of the conductors a, will de-energize magnet 69 and permit plate 67 to drop and display the "Not working" sign. The dropping of armature 68 which dropping preferably is retarded or slowed up to permit shifting of the switching means to another contact without disturbance immediately establishes a shunt circuit to energize the electro-magnets E singly and successively in advance of the armature of rotatable switch arm 51 of signal dial B until the index finger of the dial has made a complete revolution back to its last reading. If no change in draft of the ship and position of float 5 has taken place in the meantime, the index finger will continue to revolve until such change does take place and then the signal dial will give a correct reading of the draft notwithstanding the inoperativeness or malfunction of that single circuit which it will be understood represents only one inch of difference in draft of the ship. Of course the comparatively rapid movement of the index finger around the dial during corrective proceedings will in itself display an abnormal condition within the apparatus, and corrective measures could then be taken, but the point is that the device will continue to function and give correct readings at all drafts except where one or more of the independent circuits for the draft in inches may be temporarily out of order.

Figure 13:
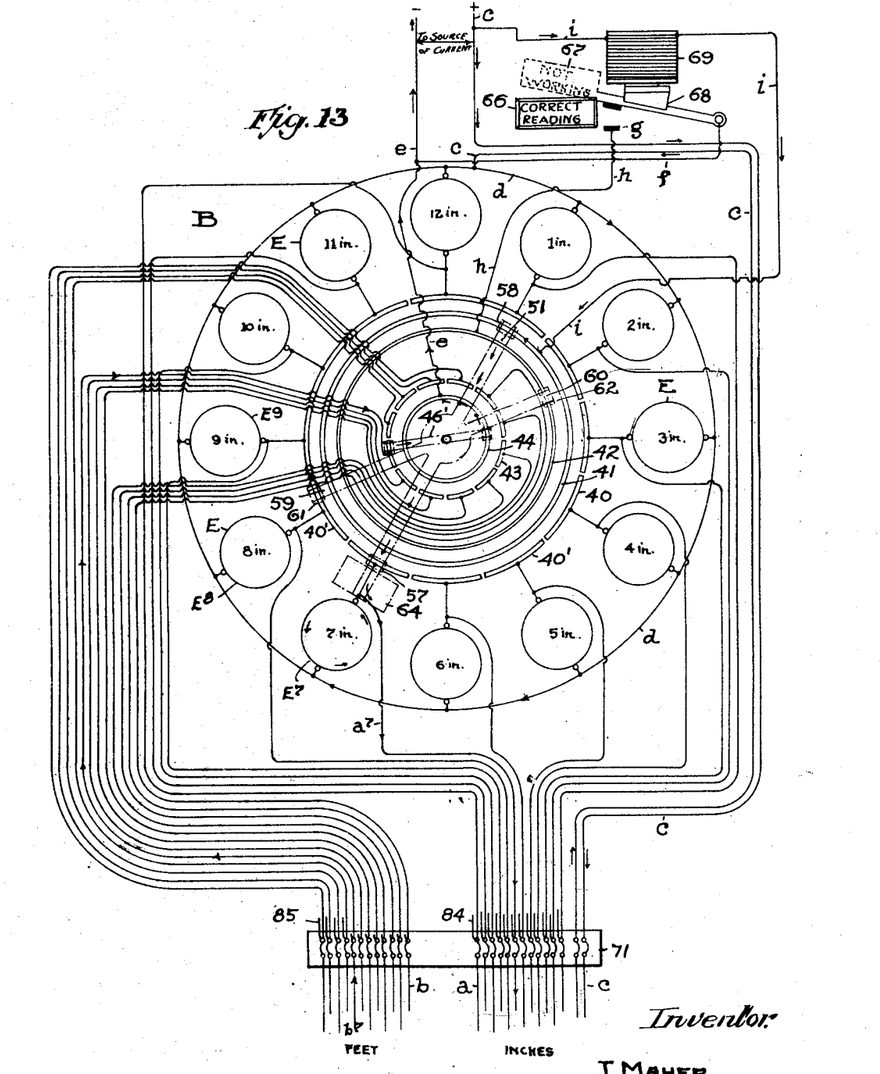
Fig. 13 is an electrical diagram of the wiring for one of the electromagnetic indicators.
Figure 14:
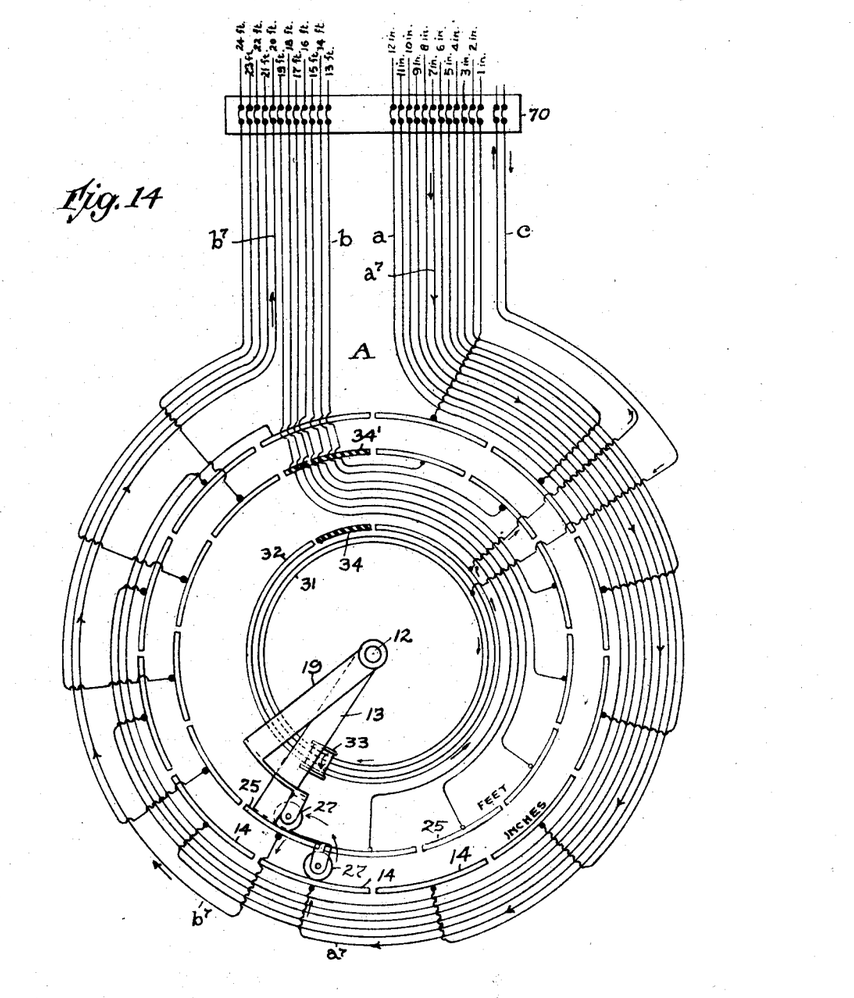
Fig. 14 is an electrical diagram of the wiring for the float controlled switch.

The electrical circuits of the system involving the signaling dial B and the float-operated switch A are shown in Figs. 13 and 14, respectively. By placing these two figures one above the other and matching the wires at the terminal or plug bars 70 and 71, a complete working diagram of the signaling system may be obtained, that is, in so far as only two such co-operating devices are concerned, it being understood that a plural number of signal dials B may be connected in multiple with selective switch A, including a signaling dial hereinafter described which is adapted to be set manually for different drafts and which automatically indicates or gives an alarm when the ship is passing from safe waters into shallower waters or when it is not safe to ignore the limits of the draft indicated.

Referring first to Fig. 14 which shows the wiring for float-operated switch A, the outer ring of twelve segmental contacts 14 represents the track engaged by switch arm 13 which signals inch movements of float 5, and the inner ring of thirteen segments 25 represents the track engaged by the slower-moving switch arm 19. The twelve inch-signaling contacts 14 are connected to twelve separate wires forming a group $a$ terminating at a plug or coupling bar 70, and twelve of the contacts 25 are connected to twelve wires forming a second group $b$ terminating at the same plug or coupling bar 70. The two smaller rings or tracks 31 and 32 are also connected by two wires $c$ to bar 70. Now referring to the diagram of the combined signaling dial and switch B, the coupling plug or bar 71 has two groups of twelve wires each and a pair of wires connected therewith which are marked $a$, $b$ and $c$ to avoid confusion and to show that these wires are mere continuations of the wires connected with bar 70. The wires in group $a$ connect the twelve contacts 14 with the twelve complementary contacts 40' of signal dial B and also with the twelve electro-magnets E, which have a common electrical connection $d$ tapped to one of the wires $c$, the other wire of this pair $c$ extending to the electric source of supply marked by a + sign, see Fig. 13. The group of twelve wires marked $b$ in Fig. 13 are separately connected to the twelve contacts in the small ring or annular track 43 in dial B, and these contacts are complementary to the twelve contacts 25 representing the draft in feet in float-operated switch A. The slow-moving contact arm 19 in selective switch A corresponds to and is designed to move synchronously with the slow-moving switch element 46' which contacts with segments 43 and also with conductor ring 44 which is connected by a wire $e$ to the source of supply as indicated by a minus sign in Fig. 13. A wire $f$ extends from wire $e$ to the pivot of armature 68 of electro-magnet 69, which armature when it drops is adapted to engage a contact $g$ connected by a wire $h$ with conductor ring 42 whereby the current may be shunted from its source to switch arms 60 and 59 to a segment 40' to energize an electro-magnet E in the event of mal-function in operations through switch A. A wire $i$ connects magnet 69 with the source of supply and with conductor ring 41 which is constantly engaged by switch element 58 carried by arm 51, whereby said magnet is constantly energized during the normal operation of signal dial B or until one or more of the circuits in group $a$ or $b$ fail to function.

As one example in operations, assume the draft of the ship is indicated on dial B as 20 feet and 6 inches, and the draft changes to 20 feet, 7 inches. This change causes float 5 in column 2 to rise one inch, and counterweight 15 suspended from the small reel on drum 11 of switch A rotates the drum and switch arm 13 one-twelfth of a revolution, which shifts the contact roller on arm 13 from contact 14 representing a draft of 20 ft. 6 inches, to the next contact 14 representing a draft of 20 ft. 7 inches. The second arm 19 of switch A moves so slowly that it will still remain in contact with the same segment 25 representing the same draft in feet as before, therefore the electric current will flow out of switch A over the same wire or circuit in group $b$ as before, although coming into switch A over a new wire or circuit. As a result the single energized electro-magnet E in dial switch B is de-energized and the succeeding electro-magnet in the circle is energized, thereby attracting armature 64 and rotating switch arm 51 one-twelfth of a revolution where it will be held by the energized magnet until a change in position of float 5 again occurs. In switching the electric current in this way the return is through one of the wires in group *b* which connect complementary segments for the slow-moving switch arms or elements in switches A and B, and unless the slow-moving switch arms or elements in the two switches are in corresponding positions upon the two sets of contacts, the dial switch will not operate. Assuming switch A as having moved to a new position and the dial switch actuated correspondingly as stated the circuit over which the electric current flows from its source to its return may be traced in Figs. 13 and 14 by the wires *c* leading to conductor 31 in switch A, across roller 33 to conductor 32 and thence back to dial switch B, where wire *c* connects with the common connection *d* for electro-magnets E. The draft in the present instance being at seven inches the current will pass from wire *d* through electro-magnet $E^7$ and thence back over wire $a^7$ to the seventh segment 14, across roller 27 to arm 13 and through shaft 12 to arm 19 to the seventh segment 25 in the second ring of contacts in switch A, and thence over wire $b^7$ back to the eighth contact 43 in the small ring or track which is engaged by the slow-moving switch element 46', the current passing through this arm to the conducting track 44 and thence to the source of supply by way of wire *e*, see Fig. 13. A shunt circuit is also established for the annunciator magnet 69 over wire *i* to conductor ring 41 in dial switch B, the shunted current flowing to the spring contact element 58 on switch arm 51, thence through the arm to spring contact 57 and the seventh segment 40' opposite electro-magnet $E^7$ and thence to wire $a^7$ and back to switch A and over return wire $b^7$ to the source of supply, thus causing annunciator magnet 69 to hold its armature 68 in a raised position to indicate that the reading is correct. But assume either circuit $a^7$ or $b^7$ to be in an inoperative condition the annunciator magnet 69 will be de-energized and its armature 68 will drop by gravity and display the "Not working" sign at window 66, and in this position of parts a corrective or operative circuit is established by armature 68 at contact *g*, the current then being caused to flow from wire *c* to *d*, through the eighth electro-magnet $E^8$ to the eighth segment 40', thence through roller 61 to switch elements 59 and 60 to roller 62 and track 42, and thence by wire *h* to contact *g* and armature 68 and back to wire *e* and the source of supply by way of wire *f*. Obviously in this case, electro-magnet $E^8$ will be energized and the armature on switch arm 51 will be attracted thereby rotating said arm one-twelfth of a revolution and advancing switch element 59 in the same degree to the ninth segment 40' opposite electro-magnet $E^9$, thus establishing another circuit in place of the preceding one to energize the electro-magnet $E^9$ and cause the switch arm 51 to continue its rotation, a proceeding which will be repeated by each succeeding electro-magnet in the circle indefinitely until the annunciator magnet 69 is again energized to break contact at *g* or the electric current entirely cut off from its source. The rapid rotation of the dial index finger will in itself show that one of the independent circuits is out of order and suitable precautions and corrective measures can be taken, but the system and apparatus as a whole is still operative and will give correct readings of all other draft condition, excepting at the inoperative circuit which involves only one inch change in the full draft of the vessel. For example, in loading a ship, a change in draft of only one inch would place float 5 in a different zone in column 2 and thereby rotate switch B to a new contact position adapted to establish an operative circuit the instant the movable switch elements of dial B reach the same corresponding position as the switch elements in float switch A. In other words, when one of the circuits representing a movement of one inch of float 5 becomes inoperative at an indicated draft level, the dial switch will continue to rotate until the switch parts in both switches again rest on complementary sets of contacts. In the meantime, if any change in draft in inches of the ship occurs, the float has shifted switch A and an independent circuit involving new complementary sets of contacts will become active in lieu of the inoperative set and thus energize annunciator magnet 69 and break the corrective circuit at *g*, thereby stopping the index finger to give a correct reading of the changed draft of the vessel.

Reverting to the purpose of circuit 6 which is controlled by switch A, when float 5 has moved to a predetermined distance in column 2, say when column 2 is drained or the ship is in dry dock and the apparatus is not needed, switch arm 19 will be placed opposite the dead contacts 34 and 34' shown in Fig. 14, and the electric current will then be cut off from its source, which places the apparatus temporarily out of commission.

Figures 11, 12:
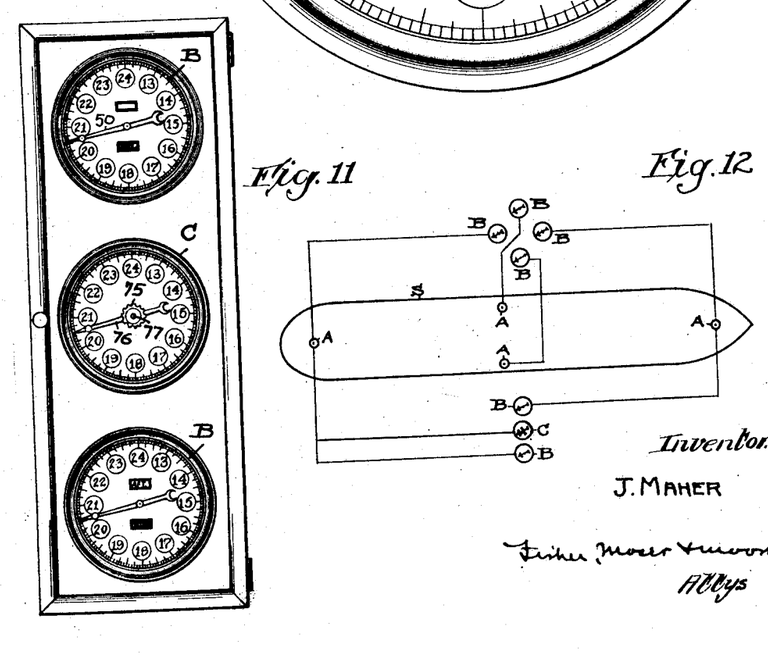
Fig. 11 is a reduced view of a cabinet containing three dials, two being of the automatic type shown in Fig. 10, and the central dial representing a manually operative switch adapted to effect a warning signal as set.
Fig. 12 is a diagram, illustrative merely of a plural number of switches and indicators, as may be arranged on a ship, fore and aft and amidship on a ship, according to my invention.
Figure 15:
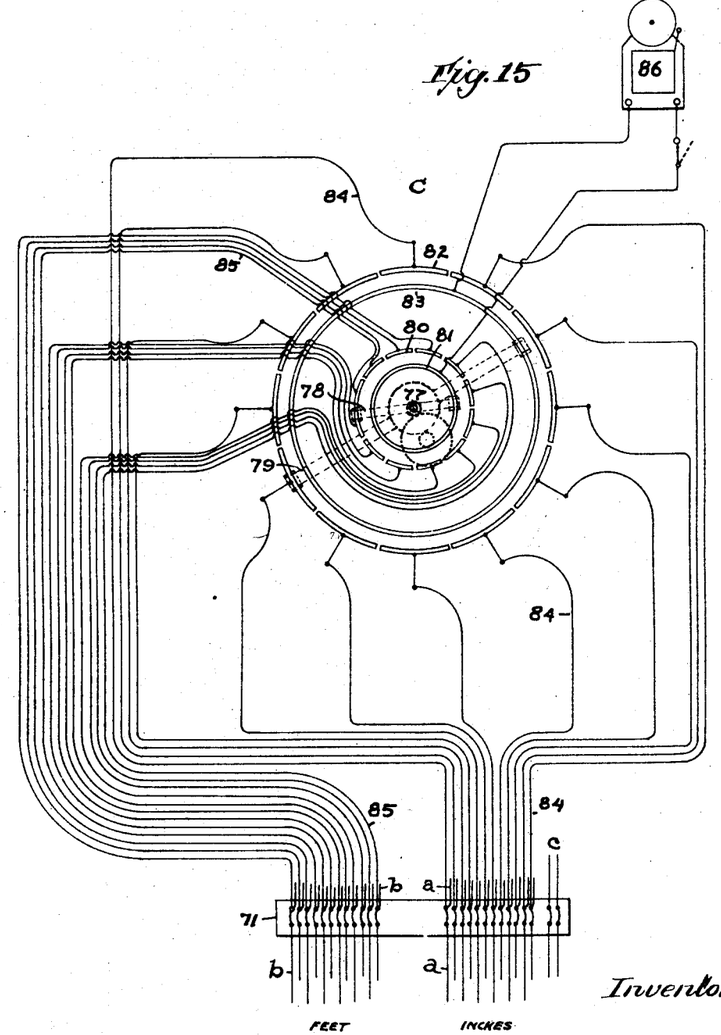
Fig. 15 is an electrical diagram of the wiring for the switch which may be operated manually and set, to co-act with the float switch in giving warning signals.

In navigating a ship at regular speed and a known draft no change in draft will take place under ordinary conditions, but it is a known fact that a ship will settle at the stern, especially a ship driven by a propeller, in speeding into shallower water, therefore I find it desirable to include an automatic signaling dial C in co-operating connection with one or more dials B, which will indicate or sound an alarm automatically upon any change in draft when running at regular speed, for example, when the ship speeds into shoal places or over a bar or reef. Thus, in Fig. 11, the central dial C corresponds in appearance to dials B, but as a matter of fact device C is not equipped with electro-magnets, although provided with the same differentially rotating gear and switch mechanism as in dial B. Instead it has a handle or knob 75 adapted to rotate the working parts by hand or manually, including a pointer 76 to turn to the graduations representing the draft of the boat in feet and inches. The spindle 77 upon which the knob and pointer are supported, carries two switch arms 78 and 79, respectively, see Fig. 15, having contact rollers at their opposite ends adapted to ride on four separate circular tracks 80, 81, 82 and 83, respectively. Tracks 80 and 82 comprise twelve separate segments corresponding to segments 43 and 40′ of dial switch B, and the segments 80 and 82 are separately connected by separate sets of wires 84 and 85, respectively, to corresponding wires in groups a and b for dial B, the connections being made at bar 71, see Fig. 15.

By setting the switching elements 78 and 79 manually through handle 75 to any given radial position in alarm dial C, the movable switching elements in dial B will, when automatically rotated to the same corresponding position, establish an operative circuit over the circuits 84 and 85 in dial C which will ring an alarm bell 86 or an equivalent signaling device, the electric current being supplied from its source through lines c, d, and a in signal dial B. When the ship is running the draft of the ship is indicated on dial B, and the navigator may set pointer 76 of alarm dial C a point or two in advance of the mark indicated on signal dial B so that the alarm circuit will not operate under normal draft but will respond when the ship settles an inch or two at the stern, it being recalled that float A in column 2 will operate dial B at each change in draft in inches, and it being further understood that the movement of the switch parts in dial B will eventually bring them to a radial position corresponding to the set position of the switch parts in dial C.

The general adaptability of the invention is not limited to indicating the draft or list of a ship; it may also be used to indicate the movement of the rudder of a ship, or other movable object, and it may be utilized to advantage in signaling the depths of water in canals, locks and reservoirs. Thus, separate float columns and selective switches may be placed in the several locks of a canal and co-operating signaling dials may be grouped remotely therefrom, say at the entrance or a central supervising station for the canal to enable the changing levels in the canal to be under constant observation and to facilitate the passing of ships of different draft through locks of the canal.

What I claim is:

1. In an indicator system, an indicator comprising a plurality of electromagnets, an armature, means for mounting said armature so that it may be moved in a fixed cyclic path by the electromagnets, a transmitter including a movable member, means for individually and successively closing the circuits to the indicator magnets to move the armature in its path in accordance with the movements of the movable member, and means including the armature and magnets operable when the transmitter is associated with an open magnet circuit to move said armature continuously over its path until the transmitter is moved to close a circuit through another coil.

2. In an indicating system an indicator comprising a plurality of electromagnets arranged in a circle, an armature, means for mounting said armature so that it may be rotated by the magnets, a transmitter including a movable member, means for individually and successively closing the circuits to the indicator coils to rotate the armature in accordance with the movements of the transmitter member and means operable when the transmitter is associated with an open coil circuit to rotate said indicator armature continuously until the transmitter is moved to close a circuit through another coil.

3. In an indicator system, an indicator comprising a plurality of electromagnets, an armature, means for mounting said armature so that it may be moved in a fixed cyclic path by the electromagnets, a transmitter including a movable member, means for individually and successively closing the circuits to the indicator magnets to move the armature in its path in accordance with the movements of the movable member, and means including the armature and magnets operable when the transmitter is associated with an open magnet circuit to move said armature continuously over its path until the transmitter is moved to close a circuit through another coil, said last named means including a relay, a normally closed circuit through the relay winding in series with all the indicator coils, successively, an arm on the indicator arm in contact with an adjacent indicator coil, and a circuit through the arm, the relay contacts, and the adjacent coil which is closed when the contacts of the relay are closed, due to an open circuit through an indicator coil.

4. In an indicating system an indicator comprising a plurality of electromagnets arranged in a circle, an armature, means for mounting said armature so that it may be rotated by the magnets, a transmitter including a movable member, means for individually and successively closing the circuits to the indicator coils to rotate the armature in accordance with the movements of the transmitter member and means operable when the transmitter is associated with an open coil circuit to rotate said indicator armature continuously until the transmitter is moved to close a circuit through another coil, said last named means including a relay, a normally closed circuit through the relay winding in series with all the indicator coils, successively, an arm on the indicator arm in contact with an adjacent indicator coil, and a circuit through the arm, the relay contacts, and the adjacent coil which is closed when the contacts of the relay are closed, due to an open circuit through an indicator coil.

In testimony whereof I affix my signature hereto.

JOHN MAHER.